(12) United States Patent
Schostek

(10) Patent No.: US 12,465,222 B2
(45) Date of Patent: Nov. 11, 2025

(54) MEDICAL SENSOR AND METHOD FOR CALIBRATION

(71) Applicant: Ovesco Endoscopy AG, Tübingen (DE)

(72) Inventor: Sebastian Schostek, Tübingen (DE)

(73) Assignee: Ovesco Endoscopy AG (DE)

( * ) Notice: Subject to any disclaimer, the term of this patent is extended or adjusted under 35 U.S.C. 154(b) by 440 days.

(21) Appl. No.: 17/854,886

(22) Filed: Jun. 30, 2022

(65) Prior Publication Data

US 2023/0000368 A1 Jan. 5, 2023

(30) Foreign Application Priority Data

Jul. 1, 2021 (EP) .................................... 21183300

(51) Int. Cl.
*A61B 5/02* (2006.01)
*A61B 5/00* (2006.01)
(Continued)

(52) U.S. Cl.
CPC ...... *A61B 5/02042* (2013.01); *A61B 5/14546* (2013.01); *A61B 5/1459* (2013.01);
(Continued)

(58) Field of Classification Search
CPC ............ A61B 5/02042; A61B 5/14546; A61B 5/1459; A61B 5/1495; A61B 5/6861;
(Continued)

(56) References Cited

U.S. PATENT DOCUMENTS

2008/0097182 A1\* 4/2008 Schostek ................ A61B 5/073
600/371
2011/0306855 A1\* 12/2011 Rabinovitz ........ A61B 5/14539
600/371
2018/0168490 A1 6/2018 Jones et al.

FOREIGN PATENT DOCUMENTS

EP 1875858 A2 1/2008
EP 1875858 A3 2/2008
(Continued)

OTHER PUBLICATIONS

Hellman, "Understanding the Differences: CPU vs. Processor", Industrial Automation Co., (Year: 2024).\*
(Continued)

*Primary Examiner* — Joel Lamprecht
*Assistant Examiner* — Amy Shafqat
(74) *Attorney, Agent, or Firm* — Buchanan Ingersoll & Rooney PC

(57) ABSTRACT

A medical capsule with a sensor device comprising a light emitting element and a light detecting element with the sensor device being adapted to detect the presence or non-presence of blood and/or Biliverdin based on the light absorption properties of blood and Biliverdin. The capsule is provided with a casing forming a gap at its outer surface. The light emitting element alternatively emits violet light of a wavelength of about 380-450 nm, green light of a wavelength of about 530-580 nm, and red light of a wavelength of about 620-750 nm, whereas the light detecting element generates a separate sensor signal associated with measured (Continued)

light intensities $I_{violet}$, $I_{green}$, and $I_{red}$ of at least each of the wavelength ranges of the light from the light emitting element. By evaluating a quotient $I_{red}/I_{green}$, false-positive detection of blood can be avoided. The present disclosure also relates to a calibration method for said medical capsule.

15 Claims, 2 Drawing Sheets

(51) Int. Cl.
 *A61B 5/145* (2006.01)
 *A61B 5/1459* (2006.01)
 *A61B 5/1495* (2006.01)
(52) U.S. Cl.
 CPC .......... *A61B 5/1495* (2013.01); *A61B 5/6861* (2013.01); *A61B 5/4238* (2013.01)
(58) Field of Classification Search
 CPC ..... A61B 5/4238; A61B 5/073; A61B 5/1455; A61B 5/4283
 See application file for complete search history.

(56) References Cited

FOREIGN PATENT DOCUMENTS

| | | |
|---|---|---|
| EP | 2057934 A1 | 5/2009 |
| EP | 3269298 A1 | 1/2018 |
| WO | 2013088444 A2 | 6/2013 |

OTHER PUBLICATIONS

Extended European Search Report for European Application No. 21 183 300.9, dated Dec. 20, 2021, 8 pages.

Schostek et al., "Volunteer Case Series of a New Telemetric Sensor for Blood Detection in the Upper Gastrointestinal Tract: The HemoPill", Dig. Dis. Sci., 2016, 61:2956-2962.

* cited by examiner

MEDICAL SENSOR AND METHOD FOR CALIBRATION

This application claims priority to European Patent Application No. EP 21183300.9, filed Jul. 1, 2021, which is incorporated herein by reference.

DESCRIPTION

Technical Field

The present disclosure relates to a medical capsule equipped with a sensor device adapted to detect blood, especially gastrointestinal bleeding, and bile containing Biliverdin as well as differentiate both from each other. The present disclosure also relates to a calibration method for said medical capsule.

Background of the Disclosure

Acute upper gastrointestinal bleedings (GI bleedings) from ulcers or esophago-gastric varices are life threatening medical conditions which require immediate endoscopic therapy. Despite successful endoscopic hemostasis, there is a significant risk of rebleeding often requiring close surveillance of these patients e.g. in the intensive care unit. Any time delay to recognize bleeding may lead to a high blood loss and increases the risk of death. The presence of Biliverdin, which has similar light absorption properties as blood, in the duodenum of patients with certain liver associated conditions may lead to false blood detection readings. Hence, a reliable way to detect the presence of blood is necessary.

PRIOR ART

EP 2 057 934 A1 and EP 1 875 858 A1 of the present inventor disclose a swallowable sensor with a measurement gap between a light source and a detecting element in order to detect active bleeding in the stomach by measuring characteristic optical properties of blood. EP 3 269 298 A1 discloses a different blood detection device which is anchored within a hollow organ. Specifically, the high absorption in the range of violet light with a wavelength of 380 nm-450 nm (preferably 415 nm) in combination with the low absorption of red light with a wavelength of 620 nm-750 nm (preferably 700 nm) constitute to the characteristic optical property of blood. Transmission of violet light is up to three orders of magnitude lower than transmission of red light depending on the optical density of the blood sample. By calculating a quotient of the measured intensity of red light divided by the measured intensity of violet light, an indicator value is provided to predict the presence of blood in the measurement gap of the sensor. In other words, a higher concentration of blood occurs when the quotient increases with decreasing measured intensity of violet light. By telemetric communication with an extracorporeal receiver, information about the bleeding status is transmitted and can be displayed.

The optical sensor can be designed to allow a differentiation between blood and bile. Bile contains Bilirubin as colorant that has similar optical characteristics as blood, yet much less pronounced. In clinical use, the exposure of the sensor to bile is very likely, as bile is often present in high concentrations in the duodenum, through which the optical sensor naturally travels on its way through the gastrointestinal tract.

Bilirubin is a product of the Haem molecule, an essential part of blood, which is responsible for the optical characteristics exploited by this optical sensor for the detection of blood. A differentiation between blood and bile can be accomplished e.g. by means of a threshold to which the quotient of red and violet light transmission is compared.

The chemical reactions that are responsible for producing bile may be disturbed for patients with certain liver-associated conditions (e.g. liver cirrhosis). In particular, the conversion process from Haem to Bilirubin may be impeded, resulting in the presence of Biliverdin as an intermediate product of this reaction chain. Biliverdin is categorized as a colorant in bile, similar to Bilirubin. In such cases, the composition of colorants in the bile juice and therefore its optical absorption properties are altered. In particular, Biliverdin exhibits a higher absorption of violet light with a wavelength of around 415 nm than Bilirubin (however still less than Haem), resulting in a lower transmission intensity of violet light. Therefore, the presence of Biliverdin may cause the quotient of the measured intensity of red light divided by the measured intensity of violet light to increase to values comparable to that of the quotient in case blood is present (in low concentrations), which may be interpreted as false positive reading by the user when applying the optical sensor in patients with suspected GI bleeding. It has been observed in experiments, that the concentration of Biliverdin in patients can, under certain circumstances and in rare cases, reach an unusually high concentration level at which the measured sensor values might falsely suggest the presence of blood (false-positive reading).

Therefore, it is an object of the disclosed sensor to improve its detection capabilities and especially to allow a differentiation between a presence of blood and a presence of bile containing Biliverdin when the quotient of the measured intensity of red light divided by the measured intensity of violet light is close to or in the range of an indication for the presence of blood, resulting in a risk reduction of false positive readings of the sensor.

BRIEF DESCRIPTION OF THE DISCLOSURE

The object of the disclosed sensor as discussed above is achieved with a medical capsule and its calibration methods. Further advantageous developments and embodiments of the disclosure are subject-matter of the dependent claims.

A medical capsule according to the disclosure is being equipped with a sensor device comprising at least one light emitting element and at least one photosensitive/light receiving/light detecting element with the sensor device being adapted to detect the presence or non-presence of blood and/or Biliverdin based on the light absorption properties of blood and Biliverdin. The medical capsule is provided with a casing/shell forming a recess/gap at its outer surface. Alternatively, the outer surface of the medical capsule comprises two recesses/gaps. The at least one light emitting element, preferably at least one LED, alternatively/alternatingly or parallelly emits (preferably monochromatic) violet light, preferably of a wavelength of about 380-450 nm, green light, preferably of a wavelength of about 530-580 nm, and red light, preferably of a wavelength of about 620-750 nm (respectively), whereas the at least one light detecting element generates a separate sensor signal associated with measured light intensities $I_{violet}$, $I_{green}$, and $I_{red}$ of at least each of the wavelength ranges of the light from the light emitting element.

In other words, the at least one light emitting element of the sensor device of the medical capsule according to the present disclosure is capable of emitting (preferably monochromatic) green light of a third wavelength of about 530-580 nm (preferably 570 nm). The at least one light detecting element of the sensor device, arranged on the other side of the recess, which faces the light emitting element, is preferably designed to be sensitive to all ranges of the light emitted alternatively by the at least one light emitting element and generates a separate sensor signal associated with the measured light intensity of the violet, green, and red light respectively, after the light has passed through the measuring gap located on the medical capsule surface.

The light of the at least one emitting element of the medical capsule according to the disclosure passes through the sensor gap in which it is absorbed, reflected, and/or transmitted to different degrees depending on the content/substance in the gap between the at least one light emitting element and the at least one light detecting element. Preferably, the at least one light emitting element generates voltage levels as the separate sensor signal associated with the measured light intensity of the violet, green, and red light.

The preferably monochromatic light is light of essentially a single color, having a spectral half width generally associated with the use of respective LEDs or filters. The monochromatic light can be generated by the light emitting elements (e.g. in case of the use of color LEDs) or by applying a filter between a light emitting element and a photo detector/light detecting element. Such a filter can be positioned on either side of the recess. In other words, the at least one light emitting element of the medical capsule is provided as a plurality of LEDs that emit the light with the respective wavelengths. Alternatively, the at least one light emitting element is provided as a single LED with a plurality of filters, each associated with the wavelength of the respective light.

As the absorption characteristics of blood and bile containing Biliverdin are similar (however differently pronounced) for light in the violet and red ranges of the visible spectrum, they differ for green light in the range of 530-590 nm, for which bile containing Biliverdin shows a transmission percentage in the range of 90% while blood shows a high degree of absorption. Specifically, undiluted bile containing a high concentration of Biliverdin can lead to the same or a very similar quotient $I_{red}/I_{violet}$ of the measured intensity of red light divided by the measured intensity of violet light as blood in very low concentrations. Therefore, green light with a wavelength range of 530-590 nm is introduced as a third output emitted by the at least one light emitting element of the medical capsule, in order to be able to distinguish a quotient of the measured intensity of red light divided by the measured intensity of violet light in the case where undiluted bile containing Biliverdin in high concentrations is present from a quotient of the measured intensity of red light divided by the measured intensity of violet light in the case highly diluted blood is present (as to not to mistake a presence of Biliverdin for a presence of blood in low concentrations).

According to an aspect of the invention, the sensor device of the medical capsule differentiates the presence of blood from the presence of bile containing Biliverdin by evaluating a quotient $I_{red}/I_{green}$ of the measured intensity of red light $I_{red}$ divided by the measured intensity of green light $I_{green}$ transmitted to the at least one light detecting element.

In other words, the newly introduced quotient $I_{red}/I_{green}$ of the intensity of red light divided by the intensity of green light measured by the at least one light detecting element of the medical capsule is used to desensitize the quotient $I_{red}/I_{violet}$ of the measured intensity of red light divided by the measured intensity of violet light in a case when the value of $I_{red}/I_{green}$ is above an empirical evaluated threshold. With an increasing concentration of blood, the quotient $I_{red}/I_{green}$ of the measured intensity of red light divided by the measured intensity of green light rises significantly, similar to the quotient $I_{red}/I_{violet}$ whereas it remains almost the same when bile containing Biliverdin is present, since bile containing Biliverdin shows a low absorption of green light, leading to a high intensity for green light $I_{green}$ measured by the light detecting element.

In order to calibrate the measurement process of the medical capsule according to a first embodiment, a measurement value HI for the likelihood of presence of blood is defined as $$HI = 0,5 \cdot \log\left(\frac{I_{red}}{I_{violet}}\right) \cdot C,$$

with C being a correction factor.

The purpose of applying the logarithm function on the quotient is to generate an indicator value which can be displayed in a graph on a linear rather than a logarithmic axis. This serves the easy interpretation through the user and therefore increases usability of the system. The coefficient of 0.5 is an arbitrary value.

According to this first embodiment of the medical capsule, a measurement value in current clinical use $$HI = 0,5 \cdot \log\left(\frac{I_{red}}{I_{violet}}\right)$$

calculated from the measured intensity of red light divided by the measured intensity of violet light is multiplied by a correction factor C in order to take a possible presence of bile containing Biliverdin into account. Generally, the value HI increases with an increasing quotient $I_{red}/I_{violet}$, meaning a higher HI value results in a higher possibility that blood is present in the measurement gap of the medical capsule.

The correction factor C for the measurement value HI according to the first embodiment of the present invention is defined as C=1 if the quotient $I_{red}/I_{green}$ is above a predetermined threshold T and as C<1 if the quotient $I_{red}/I_{green}$ is below the threshold T. A correction factor of C=1 results in an unchanged HI value when the quotient $I_{red}/I_{green}$ is above the certain threshold T in case blood is detected in the measurement gap of the medical capsule. A value of C=1 is selected for this scenario in the first embodiment but it is noted that the correction factor C could also be set to a different value. In case the quotient $I_{red}/I_{green}$ is below a threshold T, a lower correction factor C is preferred (lower than in a case when the quotient $I_{red}/I_{green}$ is above the certain threshold T), thus reducing the measurement value HI, in order to prevent falsely indicating the presence of blood when bile containing Biliverdin is present in the measurement gap of the medical capsule.

The correction factor C in a preferred modification of the first embodiment of the invention is defined as C=1 if the quotient $I_{red}/I_{green}$ is above the predetermined threshold T and as $C=I_{red}/I_{green} \cdot 1/T$ if the quotient $I_{red}/I_{green}$ is below the predetermined threshold T.

This means, the correction factor C is a function of the quotient $I_{red}/I_{green}$ and the threshold T in this preferred modification of the first embodiment. This prevents a jumping of the HI value in case the correction factor C is continuously changing between two constant values in case the value of the quotient $I_{red}/I_{green}$ is crossing the predetermined threshold back and forth. Instead, the correction factor C is reduced depending on the difference/distance between the quotient $I_{red}/I_{green}$ and the threshold T. In case the quotient $I_{red}/I_{green}$ is essentially the same as the threshold T, the correction factor C is essentially 1, while the correction factor C gets lower, the further the quotient $I_{red}/I_{green}$ is below the threshold T. On another note, in this modification of the first embodiment, multiplication with a constant coefficient or any other mathematical operation which does not eliminate an effect of reducing the correction factor depending on the quotient $I_{red}/I_{green}$ being below or above a certain threshold is possible and the threshold T can either be constant or be dependent on other factors not explicitly mentioned.

In order to calibrate the measurement process of the medical capsule according to a second embodiment, a measurement value HI for the likelihood of presence of blood is defined as $$HI = 0,5 \cdot \log\left(\frac{I_{red}}{I_{violet} + J_{Biliverdin}}\right),$$

with $J_{Biliverdin}$ being a suppression parameter.

According to this second embodiment of the medical capsule, the measurement value in current clinical use $$HI = 0,5 \cdot \log\left(\frac{I_{red}}{I_{violet}}\right)$$

is being adjusted by including a suppression additive $J_{Biliverdin}$ in the denominator of the quotient in order to take a possible presence of bile containing Biliverdin into account. Similar to the calibration method in the first embodiment of the present invention, a higher HI value means a higher possibility that blood is present in the measurement gap of the medical capsule.

The additive suppression parameter $J_{Biliverdin}$ in the measurement value HI according to the second embodiment is defined as $J_{Biliverdin}=0$ if the quotient $I_{red}/I_{green}$ is above a threshold T and as $J_{Biliverdin}>0$ if the quotient $I_{red}/I_{green}$ is below the threshold T. By defining the suppression parameter $J_{Biliverdin}$ as 0 if the quotient $I_{red}/I_{green}$ is above a certain threshold T results in an unchanged HI value in case blood is detected in the measurement gap of the medical capsule. It is noted that even if the additive suppression parameter $J_{Biliverdin}$ is defined as 0 for this case, it can be a different value. At the same time, the measurement value HI decreases if the quotient $I_{red}/I_{green}$ is below the threshold T since the suppression parameter $J_{Biliverdin}$ is greater than zero in this case.

By embedding this additive suppression parameter into the denominator of the quotient in the HI value calculation, a false-positive reading of the presence of blood in the measurement gap of the medical capsule can be prevented in case the quotient $I_{red}/I_{green}$ is below the threshold T, resulting in a more reliable detection of blood.

The additive suppression parameter $J_{Biliverdin}$ in a preferred modification of the second embodiment of the invention is defined as $J_{Biliverdin}=0$ if the quotient $I_{red}/I_{green}$ is above an empirical evaluated blood threshold $T_{Blood}$ and as $$J_{Biliverdin} = m_{Biliverdin} \cdot \left(T_{Blood} - \frac{I_{red}}{I_{green}}\right)$$

if the quotient $I_{red}/I_{green}$ is below or equal the empirical evaluated blood threshold $T_{Blood}$ with $m_{Biliverdin}$ being a linear Biliverdin suppression factor.

According to this preferred modification of the second embodiment, $T_{blood}$ is an empirically evaluated/arbitrary blood threshold used to distinguish blood from Biliverdin and vice versa by means of the quotient $I_{red}/I_{green}$ and $m_{Biliverdin}$ is a linear Biliverdin suppression factor which can be chosen arbitrarily as a linear attenuation factor with implications on the suppression parameter in case bile containing Biliverdin is present.

The distinct advantages of this second embodiment, in which the suppression parameter $J_{Biliverdin}$ is an additive parameter in the denominator of the quotient $I_{red}/I_{violet}$, are mainly the compatibility with the measured value HI by using the adjusted quotient $I_{red}/I_{violet}$ as well as using the unchanged HI value in case blood is present in the measure gap of the medical capsule. This is achieved by utilizing the case differentiation for the quotient $I_{red}/I_{green}$ based on the blood threshold $T_{Blood}$ and occurs when the quotient $I_{red}/I_{green}$ is above this threshold. An advantage of the preferred modification of the second embodiment is that by introducing the linear Biliverdin suppression factor $m_{Biliverdin}$ in the case that bile containing Biliverdin is present, meaning the quotient $I_{red}/I_{green}$ is below or equal to the blood threshold $T_{Blood}$, the impact of the quotient $I_{red}/I_{green}$ on the suppression of the measurement value HI can be adjusted by the linear suppression factor $m_{Biliverdin}$. A larger value yields a larger suppression effect and therefore a higher suppression in the event of close values of the quotient $I_{red}/I_{green}$ to the threshold $T_{Blood}$ in case of the presence of bile containing Biliverdin.

BRIEF DESCRIPTION OF THE DRAWINGS

In the following, the disclosure will be described in greater detail by means of the accompanying drawings. The figures are of a schematic nature only and are intended solely for the purpose of understanding the disclosure.

DETAILED DESCRIPTION OF THE DRAWINGS

Figure 1:
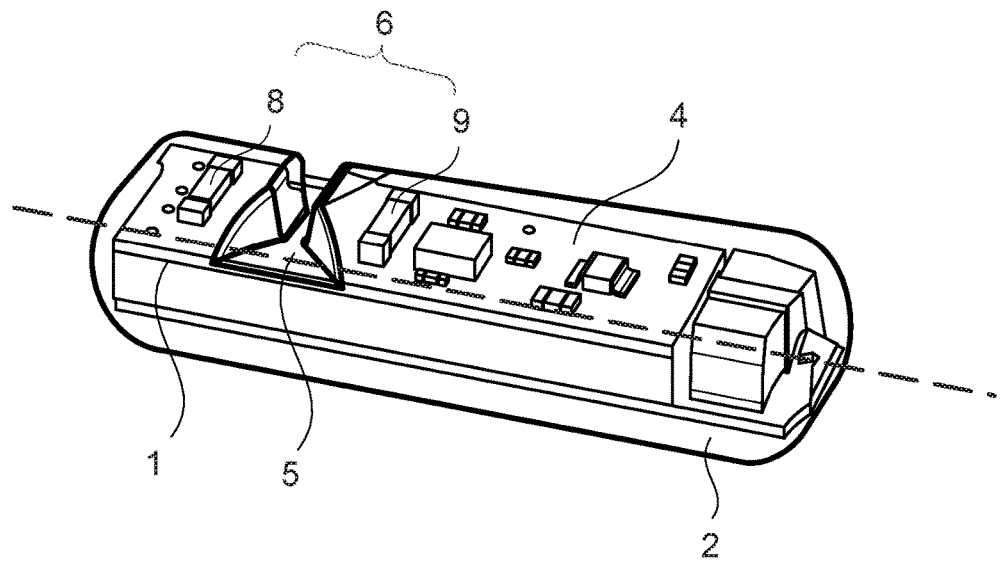
FIG. 1 is a schematic view of a medical capsule for detection of blood and/or bile containing Biliverdin according to the disclosure.

FIG. 1 shows a frontal view of the medical capsule 1 according to the disclosure. It comprises a light transmitting/permeable casing 2, preferably made of a resin material, with a substantially cylindrical outer shape with rounded end portions and edges in order to make the swallowing process easier. A circuit board 4 with a plurality of electronic facilities (not explicitly shown), e.g. a data memory and/or data transmission member, a CPU, and an energy source like a battery, is located inside the casing 2 of the medical capsule 1. The casing 2 has a lengthy recess or gap 5 being orientated substantially rectangular to the longitudinal axis of the medical capsule 1 at its outer surface while the width of the gap 5 extends in the longitudinal direction of the medical capsule 1. A sensor device 6 comprising at least one light emitting element 8 and at least one light detecting element 9 is located on top of the circuit board 4 in view of FIG. 1. The light emitting element 8 and the light detecting element 9 are arranged in such a way that each element 8, 9 is located on one side of the gap 5 in the casing 2 respectively while also facing each other. The light emitting element 8 emits (preferably monochromatic) light in visual violet (about 415 nm), green (about 570 nm), and red (about 700 nm) range, (respectively) through the gap 5 along the longitudinal direction of the medical capsule 1 which is then being detected by the light detecting element 9 located on the other side of the gap 5, when seen in the width direction of the gap 5 opposite to the light emitting element 8.

Figure 2:
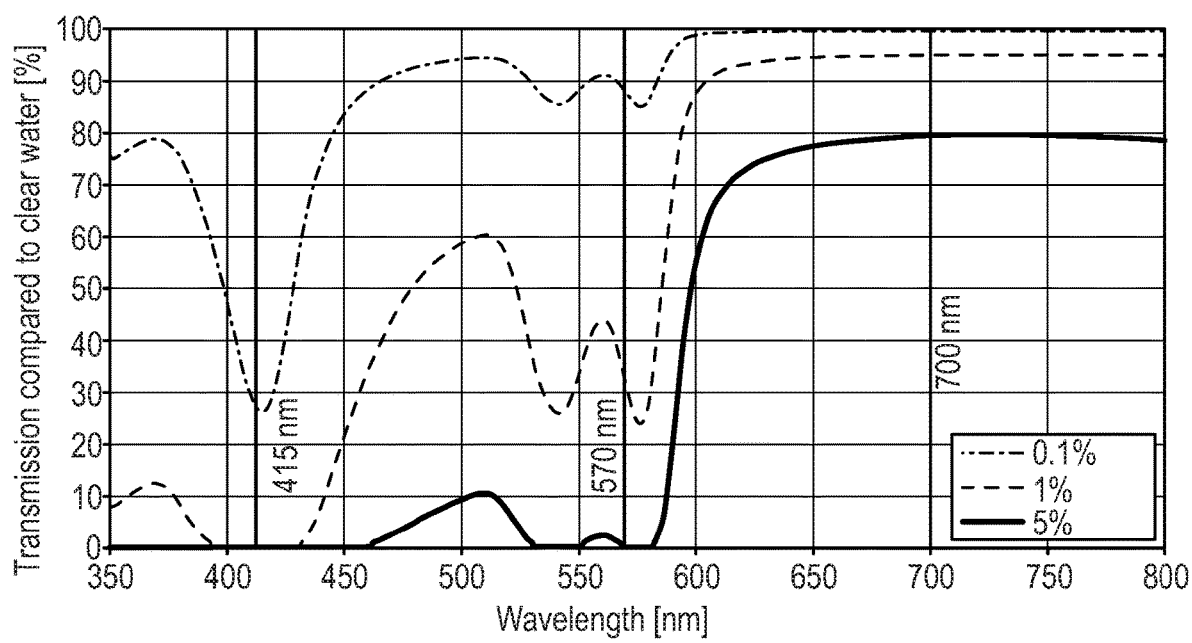
FIG. 2 is a diagram showing the transmission spectroscopy for light of different wavelengths in various blood to water ratios.

FIG. 2 shows a diagram of the transmission spectroscopy for the light of different wavelengths received by the light detection element 9 for various blood to water ratios. A percentage value of a transmission value through a blood solution compared to a transmission value through clear water, with the percentage value being 100% for a transmission in clear water, is described by the ordinate axis while the abscissa shows different wavelengths for light ranging from 350 nm to 800 nm. Additional vertical lines in the diagram emphasize the characteristic wavelengths for the visual violet (415 nm), green (570 nm), and red (700 nm) light preferably emitted by the light emitting element 8. The diagram of FIG. 2 shows three graphs for blood solutions with three specific blood to water ratios, namely 0.1% (dashed-dotted line), 1% (dashed line), and 5% (solid line). A solution containing blood absorbs a larger amount of violet light with a wavelength in the range of 380 nm to 450 nm which results in a lower transmission value of said light, and therefore, a lower measured intensity $I_{violet}$ detected by the light detecting element 9. Even for a blood solution with a low blood to water ratio of 0.1%, a significant absorption of violet light is noticeable. The minimum of the dash-dotted line in FIG. 2 shows that the maximal absorption of light occurs at the characteristic wavelength of 415 nm for violet light, which represents a transmission percentage of around 27%. By increasing the wavelength, the transmission percentage increases to a value of around 95% until reaching the wavelength range of green light (530 nm-580 nm) where the transmission percentage drops twice to around 85%. By further increasing the wavelength, the transmission percentage jumps to substantially 100% and stays at this level for the wavelengths 600 nm and higher, meaning almost no red light with a wavelength in the range 620 nm to 750 nm is getting absorbed by the blood solution with a blood to water ratio of 0.1%.

Similar transmission/absorption characteristics of light can be noticed for the curves representing blood solutions with a blood to water ratio of 1% and 5%. Both curves are shifted in negative y-direction by increasing the ratio of blood to water if compared to the course of the dashed-dotted line described above. A solution with a blood to water ratio of 1% (dashed line) shows a transmission percentage of substantially 0% for violet light and a transmission percentage of around 35% for green light in the characteristic wavelength ranges of 415 nm and 570 nm, respectively, while approximately 95% of red light is being transmitted through said blood solution. A solution with a blood to water ratio of 5% (solid line) shows a transmission percentage of substantially 0% for violet light and 0%-5% for green light in the wavelength ranges of 415 nm and 570 nm, respectively, while approximately 80% of red light is being transmitted. In other words, only 20% of red light but around 95% of green light is being absorbed by the blood solution with a blood to water ratio of 5%.

Figure 3:
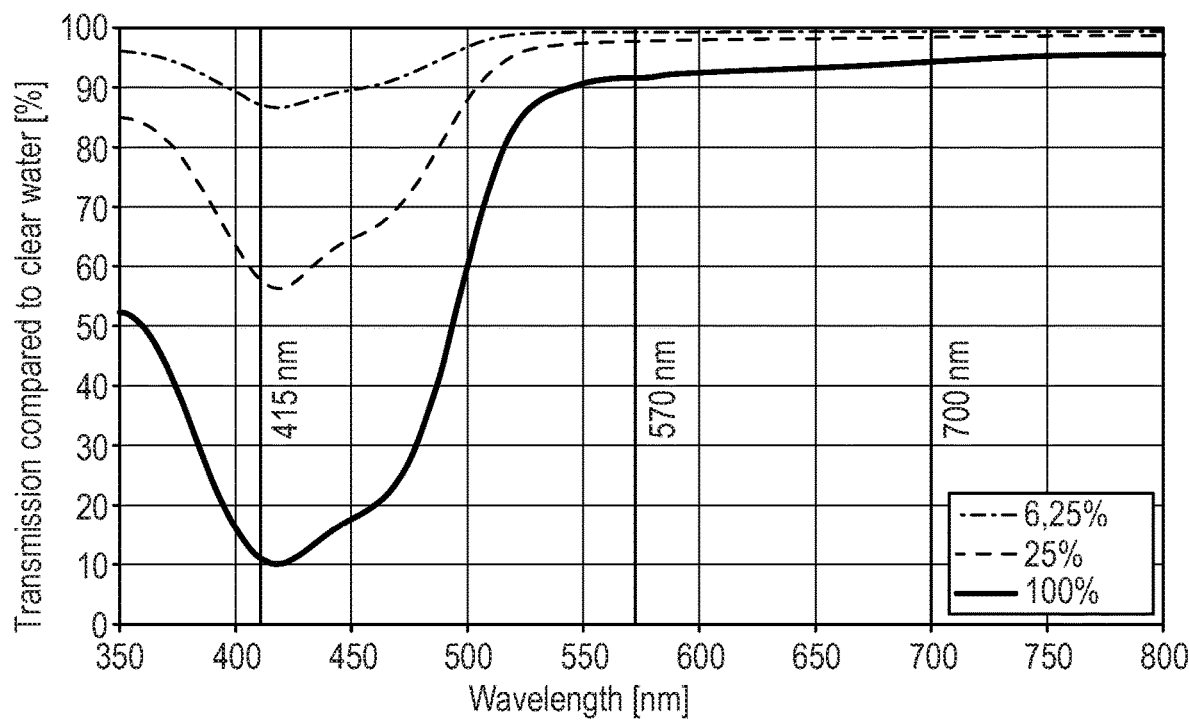
FIG. 3 is a diagram showing the transmission spectroscopy for light of different wavelengths in various bile containing Biliverdin to water ratios.

FIG. 3 shows a similar diagram of the transmission spectroscopy for the light of different wavelengths received by the light detection element 9 for various bile to water ratios, in which Biliverdin is present. Corresponding to the transmission spectroscopy for blood solutions of FIG. 2, a percentage value of a transmission value through a bile solution compared to a transmission value through clear water, with the percentage value being 100% for a transmission in clear water, is described by the ordinate axis while the abscissa shows different wavelengths for light ranging from 350 nm to 800 nm. The diagram of FIG. 3 shows three graphs for bile solutions, which contain Biliverdin, with three specific bile to water ratios, namely 6.25% (dashed-dotted line), 25% (dashed line), and 100% (solid line). All three graphs for the Biliverdin containing bile solutions show a noticeable decline in the transmission percentage for violet light with a wavelength ranging from 380 nm to 450 nm. A minimum of the light transmission percentage is around 10%, around 57%, and around 87% for the above mentioned bile solutions with bile to water ratios of 100%, 25%, and 6.25%, respectively. The higher the bile to water ratio, the more light is being absorbed. When the wavelength increases, i.e. by leaving the wavelength range of violet light, the light transmission percentage increases and the respective graphs start to flatten at a wavelength of around 525 nm for all three bile solutions. The graphs of FIG. 3 show that the majority of green light as well as red light is not being absorbed by a solution with bile containing Biliverdin, contrary to solutions containing blood. Pure bile with Biliverdin, represented by the solid line, transmits around 90% of green light and around 95% of red light, while the solutions with diluted bile containing Biliverdin absorb substantially no green and red light at all.

Figure 4:
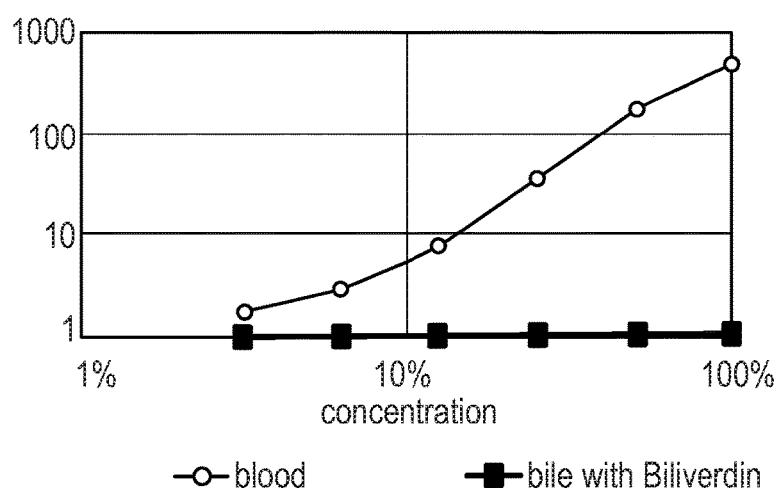
FIG. 4 is a diagram showing the quotient $I_{red}/I_{green}$ over different concentrations of blood and over different concentrations of bile containing Biliverdin.

FIG. 4 shows a logarithmic diagram portraying the value of the measured intensity of red light divided by the measured intensity of green light $I_{red}/I_{green}$ over a concentration of blood and over a concentration of bile containing Biliverdin. It is assumed that the measured intensity signals for red light and green light are essentially equal when no absorption takes place in the measurement gap 5 of the medical capsule 1, therefore, the quotient $I_{red}/I_{green}$ is essentially 1 if the measurement gap 5 of the medical capsule 1 is empty. Due to the low absorption of green light by bile containing Biliverdin, the quotient $I_{red}/I_{green}$ remains constantly low (around 1, up to about 2) over all concentrations of bile containing Biliverdin (see the line indicated by black squares in FIG. 4). On the other hand, the quotient $I_{red}/I_{green}$ rises significantly with the presence of blood with an increasing concentration of blood (see the line indicated by white circles).

As the transmission and/or the absorption value of light in the range of visible green light are significantly different for bile containing Biliverdin and for blood, the above discussed value $I_{red}/I_{green}$ of the measured intensity of red light divided by the measured intensity of green light is a reliable means to exploit these characteristics as differentiation features between Biliverdin and blood in order to differentiate the presence of blood from the presence of bile containing Biliverdin and thereby avoiding the risk of false-positively detecting blood.

The invention claimed is:

1. A medical capsule being equipped with a CPU and a sensor device, the sensor device comprising (i) at least one light emitting element, and (ii) at least one light detecting element, wherein the medical capsule is adapted to detect the presence or non-presence of blood and/or bile containing Biliverdin on the basis of light absorption properties of blood and Biliverdin, wherein the medical capsule further comprises a recess or gap at its outer surface between the at least one light emitting and the at least one light detecting element, wherein:
   the at least one light emitting element emits monochromatic violet light, monochromatic green light, and monochromatic red light, of different wavelength ranges;
   the at least one light detecting element generates a separate sensor signal associated with measured light intensities $I_{violet}$, $I_{green}$ and $I_{red}$ of at least each of the wavelength ranges of the light from the at least one light emitting element; and
   the medical capsule differentiates the presence of blood from the presence of bile containing Biliverdin by evaluating a quotient $I_{red}/I_{green}$ of the measured intensity of red light $I_{red}$ divided by the measured intensity of green light $I_{green}$ transmitted to the at least one light detecting element, for which the absorption characteristics of blood are higher than that of Biliverdin,
   the medical capsule being configured to distinguish a quotient $I_{red}/I_{violet}$ of the measured intensity of red light divided by the measured intensity of violet light in a case where bile containing Biliverdin is present from a quotient $I_{red}/I_{violet}$ in a case where blood is present.

2. The medical capsule according to claim 1, wherein the light of the at least one emitting element passes through the gap in which it is absorbed, reflected, and/or transmitted to different degrees depending on a content in the gap between the at least one opposing light emitting element and the at least one light detecting element.

3. The medical capsule according to claim 1, wherein the at least one light emitting element emits the monochromatic violet light, the monochromatic green light, and the monochromatic red light in a parallel or an alternating manner.

4. The medical capsule according to claim 1, wherein the at least one light emitting element emits the monochromatic violet light of a wavelength of 380-450 nm and/or the monochromatic green light of a wavelength of 530-580 nm and/or the monochromatic red light of a wavelength of 620-750 nm.

5. The medical capsule according to claim 1, wherein the at least one light emitting element generates voltage levels as the separate sensor signal associated with the measured light intensity of the violet, green, and red light.

6. The medical capsule according to claim 1, wherein the at least one light emitting element is provided as a plurality of LEDs that emit the monochromatic violet light, the monochromatic green light, and or the monochromatic red light or as a single LED with a plurality of filters, each filter of the plurality of filters is associated with each wavelength of the monochromatic violet light, the monochromatic green light, and the monochromatic red light.

7. The medical capsule according to claim 6, wherein the recess or gap is orientated rectangular with respect to a longitudinal axis of the medical capsule and a width of the recess or gap extends along the direction of the longitudinal axis of the medical capsule.

8. The medical capsule according to claim 1, comprising a casing with a cylindrical outer shape with rounded end portions and edges, a circuit board located inside the casing with a plurality of electronic facilities and the sensor device.

9. The medical capsule according to claim 8, wherein the at least one light emitting element and the at least one light detecting element is arranged on top of the circuit board.

10. The medical capsule according to claim 1, wherein a measurement value HI for a likelihood of presence of blood is defined as $$HI = 0,5 \cdot \log\left(\frac{I_{red}}{I_{violet}}\right) \cdot C,$$

wherein C is a correction factor.

11. The medical capsule according to claim 10, wherein the correction factor C is defined as
   C=1 if the quotient $I_{red}/I_{green}$ is above a predetermined threshold T, and
   C<1 if the quotient $I_{red}/I_{green}$ is below the predetermined threshold T.

12. The medical capsule according to claim 10, wherein the correction factor C is defined as
   C=1 if the quotient $I_{red}/I_{green}$ is above a predetermined threshold T, and
   $C=I_{red}/I_{green} \cdot 1/T$ if the quotient $I_{red}/I_{green}$ is below the predetermined threshold T.

13. The medical capsule according to claim 1, wherein a measurement value HI for a likelihood of presence of blood is defined as $$HI = 0,5 \cdot \log\left(\frac{I_{red}}{I_{violet} + J_{Biliverdin}}\right),$$

wherein $J_{Biliverdin}$ is a suppression parameter.

14. The medical capsule according to claim 13, wherein the suppression parameter $J_{Biliverdin}$ is defined as
   $J_{Biliverdin}=0$ if the quotient $I_{red}/I_{green}$ is above a predetermined threshold T, and
   $J_{Biliverdin}>0$ if the quotient $I_{red}/I_{green}$ is below the predetermined threshold T.

15. The medical capsule according to claim 13, wherein the suppression parameter $J_{Biliverdin}$ is defined as
   $J_{Biliverdin}=0$ if the quotient $I_{red}/I_{green}$ is above an empirical evaluated blood-threshold $T_{Blood}$, and
   $J_{Biliverdin}=m_{Biliverdin} \cdot (T_{Blood}-I_{red}/I_{green})$ if the quotient $I_{red}/I_{green}$ is below or equal the threshold $T_{Blood}$, wherein $m_{Biliverdin}$ is a linear Biliverdin suppression factor.

* * * * *

UNITED STATES PATENT AND TRADEMARK OFFICE
CERTIFICATE OF CORRECTION

| | | |
|---|---|---|
| PATENT NO. | : 12,465,222 B2 | Page 1 of 1 |
| APPLICATION NO. | : 17/854886 | |
| DATED | : November 11, 2025 | |
| INVENTOR(S) | : Sebastian Schostek | |

It is certified that error appears in the above-identified patent and that said Letters Patent is hereby corrected as shown below:

In the Claims

In Column 9, Line 56, delete "and or" and insert -- and/or --

Signed and Sealed this
Tenth Day of February, 2026

John A. Squires
*Director of the United States Patent and Trademark Office*